US012223350B2

(12) United States Patent
Lee et al.

(10) Patent No.: US 12,223,350 B2
(45) Date of Patent: Feb. 11, 2025

(54) PROCESS OPERATION SYSTEM AND PROCESS OPERATION METHOD FOR AUTOMATICALLY CREATING, PUBLISHING AND EXECUTING A TASK

(71) Applicant: Quanta Computer Inc., Taoyuan (TW)

(72) Inventors: Chen-Chung Lee, Taoyuan (TW); Chun-Hung Chen, Taoyuan (TW); Chien-Kuo Hung, Taoyuan (TW); Wen-Kuang Chen, Taoyuan (TW); En-Chi Lee, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 614 days.

(21) Appl. No.: 17/464,975

(22) Filed: Sep. 2, 2021

(65) Prior Publication Data

US 2023/0009722 A1    Jan. 12, 2023

(30) Foreign Application Priority Data

Jul. 5, 2021    (TW) ................. 110124548

(51) Int. Cl.
*G06F 9/48* (2006.01)
*G06F 8/65* (2018.01)
*G06F 40/30* (2020.01)

(52) U.S. Cl.
CPC .............. *G06F 9/4881* (2013.01); *G06F 8/65* (2013.01); *G06F 9/4831* (2013.01); *G06F 40/30* (2020.01)

(58) Field of Classification Search
CPC .......... G06F 9/4881; G06F 40/30; G06F 8/65; G06F 9/4831
See application file for complete search history.

(56) References Cited

U.S. PATENT DOCUMENTS

2004/0143834 A1*  7/2004  O'Rourke .............. G05B 15/02
                                                    718/100
2012/0147387 A1*  6/2012  Morrison ........... G06K 15/1857
                                                    358/1.1

(Continued)

FOREIGN PATENT DOCUMENTS

CN    112001594 A    11/2020
CN    112260877 A    1/2021

OTHER PUBLICATIONS

Chinese language office action dated May 17, 2022, issued in application No. TW 110124548.

*Primary Examiner* — Wissam Rashid
(74) *Attorney, Agent, or Firm* — McClure, Qualey & Rodack, LLP

(57) ABSTRACT

A process operating system includes a process control platform, a process operation platform and an endpoint task robot. The process control platform is configured to receive operation information, extract a task from the operation information using a semantic analysis method, and publish the task. The process operation platform is configured to receive the task and store the task in a task queue. After receiving the task, the process operating platform defines a processing flow based on the task, and sorts the order of the task in the task queue. The endpoint task robot is configured to automatically obtain the task from the process operation platform, executes the task according to the processing flow. It then writes the execution result into the log queue and transmits the execution result to the process control platform.

12 Claims, 10 Drawing Sheets

(56) References Cited

U.S. PATENT DOCUMENTS

| | | | |
|---|---|---|---|
| 2012/0159501 A1* | 6/2012 | Lee ...................... | G06F 9/4881 718/103 |
| 2020/0034447 A1* | 1/2020 | Lapointe ................. | G06F 16/13 |
| 2022/0171667 A1* | 6/2022 | Gilderman ....... | G06Q 10/06375 |

* cited by examiner

200

```
┌─────────────────────────────────┐
│ Receiving operation information,│
│ retrieving a task from the      │
│ operation information using     │─ 210
│ a semantic analysis method, and │
│ publishing the task             │
└─────────────────────────────────┘
                 ↓
┌─────────────────────────────────┐
│ Receiving tasks and storing     │
│ the tasks in a task queue;      │
│ after receiving the tasks, the  │
│ process operating platform      │─ 220
│ defines a processing flow       │
│ according to the tasks, and     │
│ sorts the tasks in the task     │
│ queue in order                  │
└─────────────────────────────────┘
                 ↓
┌─────────────────────────────────┐
│ Actively obtaining tasks from   │
│ the process operation platform, │
│ executing the tasks according   │
│ to the processing flow, writing │
│ the execution result into the   │─ 230
│ log queue, and transmitting     │
│ the execution result to the     │
│ process control platform by     │
│ the endpoint task robot         │
└─────────────────────────────────┘
```

| | |
|---|---|
| BT1 📢<br>DaVinci [idle]—ST1<br>IFO1—<br>Now \| Unfinished event<br>Number of user in service \| 0<br>2020-11-25(0-24 hrs)<br>Number of user served \| Completed event<br>5 \| 12<br>N1 | BT2 📢<br>Edith [idle]—ST2<br>IFO2—<br>Now \| Unfinished event<br>Number of user in service \| 0<br>2020-11-25(0-24 hrs)<br>Number of user served \| Completed event<br>1 \| 3<br>N2 |
| BT3 📢<br>Pepper [executing]—ST3<br>IFO3—<br>Now \| Unfinished event<br>Number of user in service \| 1<br>2020-11-25(0-24 hrs)<br>Number of user served \| Completed event<br>2 \| 188<br>▦ Pepper news crawl [in progress]<br>11/25 10:29:58<br>N3 | BT4 📢<br>Jarvis [idle]—ST4<br>IFO4—<br>Now \| Unfinished event<br>Number of user in service \| 0<br>2020-11-25(0-24 hrs)<br>Number of user served \| Completed event<br>5 \| 29<br>N4 |

← history record

| event start date | | event end date | | | | |
|---|---|---|---|---|---|---|
| 11/25/2020 | | 11/25/2020 | | | | |

| event source | | status | | enter event name | enter username | |
|---|---|---|---|---|---|---|
| all | ◆▶ | completed | ◆▶ | | | |

| username | event source | event name | start time | execution time | status | action |
|---|---|---|---|---|---|---|
| H-Y Chang | Mail | download JON | 2020/11/25 09:19:09 | 01 minutes 59 seconds | completed | 🗎 |
| DaVinci | Schedule Job | download JON quotation | 2020/11/25 09:29:59 | 15 minutes 05 seconds | completed | 🗎 |
| DaVinci | Schedule Job | download JON_AS_NPI | 2020/11/25 09:40:04 | 01 minutes 32 seconds | completed | 🗎 |
| ... | ... | ... | ... | ... | ... | ... |

BOM2

| Step | Loop | ElementName | Parameter | Condition | ResultTure | ResultFalse | Description |
|---|---|---|---|---|---|---|---|
| 1 | | web_browser_get | https://scm.asus.com/SCMPortal_2018/ | | | | enable Chrome browser |
| 2 | | web_button_click | xpath/html/body/app-root/app-login/body/div[1]/article/aside[1]/section/div[3]/div[2]/button | | | | click button |
| 3 | | web_move_to_element | LinkTextQuotation | | | | move to Menu Quotation |

FIG. 9

⌐RPLY

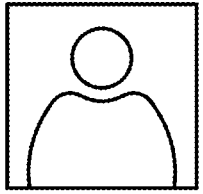

Taiwan 110/2/25 (Thursday) A.M. 09:33
RPA.AQ@quantatw.com
[Formal Environment] Notification of the successful webpage automation of RPA To Osen Jian
carbon copy Bryan Li

| skill ID | camp_auto_approve |
|---|---|
| task name | CAMP automatic sign-off (CAMP automatic sign-off ISV transaction order) |
| Event_Id | [Formal environment] 3437535 |
| execution result | Y |
| abnormal step (Orderby/Loop) | |
| abnormal operation | |
| parameter | |
| operation description | |
| exception message | |
| occurrence time | 2021/2/25 A.M. 09:32:31 |
| remarks | |

FIG. 10

PROCESS OPERATION SYSTEM AND PROCESS OPERATION METHOD FOR AUTOMATICALLY CREATING, PUBLISHING AND EXECUTING A TASK

CROSS REFERENCE TO RELATED APPLICATIONS

This application claims priority of Taiwan Patent Application No. 110124548, filed on Jul. 5, 2021, the entirety of which is incorporated by reference herein.

BACKGROUND OF THE INVENTION

Field of the Invention

The present disclosure relates to an operating system and, in particular, to a process operating system and a process operating method for automation.

Description of the Related Art

In recent years, with the substantial increase in hardware computing capabilities, the ability of machine learning algorithms in speech and image recognition has also been enhanced. Coupled with the successful training of multi-layer neural networks, the infinite imagination of artificial intelligence applications has been opened. Moreover, the successful training of multi-layer neural networks has opened up the infinite imagination of artificial intelligence applications. Enterprises have also invested a large amount of manpower and resources into the field of artificial intelligence technology, for example, the development of robotic process automation (RPA) with artificial intelligence to complete the daily tasks performed by humans in the past.

However, in the process of robot process automation, the execution authority must be provided to the deployment management center when setting the endpoint task robot. For high-tech companies, there are often specifications for the regular replacement of machine passwords. At this time, maintenance personnel must frequently perform such maintenance. In addition, the endpoint task robot is usually used on the user side, and the user may also ignore the version update of the endpoint task robot, causing the version to be too old and the task execution to fail, increasing the burden on maintenance personnel to assist users in updating the endpoint task robot.

Therefore, how to develop a lightweight process operating system so that people with non-engineering backgrounds can edit automated processes, and greatly reduce the error rate caused by the tedious work that required a lot of staff to expend a lot of effort in the past. It has become one of the problems to be solved in this field.

BRIEF SUMMARY OF THE INVENTION

In accordance with one feature of the present invention, the present disclosure provides a process operating system that includes a process control platform, a process operating platform and an endpoint task robot. The process control platform is configured to receive operation information, extract a task from the operation information using a semantic analysis method, and publish the task. The process operating platform is configured to receive the task and store the task in a task queue. After receiving the task, the process operating platform defines a processing flow based on the task, and sorts the order of the task in the task queue. The endpoint task robot is configured to automatically obtain the task from the process operating platform, executes the task according to the processing flow. It then writes the execution result into the log queue, and transmits the execution result to the process control platform.

In accordance with one feature of the present invention, the present disclosure provides a process operating method. The process operating method includes the following steps: receiving operation information, extracting a task from the operation information using a semantic analysis method, and publishing the task by a process control platform; receiving the task and storing the task in a task queue by a process operating platform; after receiving the task, the process operating platform defines a processing flow based on the task, and sorts the order of the task in the task queue; and automatically obtaining the task from the process operating platform, executing the task according to the processing flow, writing an execution result into a log queue, and transmitting the execution result to the process control platform by a process operating platform.

The process operating system and process operation method described above may use a library to store the components and their parameters as required to perform the task. If there is a change in the new component or the old component, only the library needs to be updated: there is no need to adjust the overall system and logic. A general user compiles the task flow on the setting web page according to the task requirements, the process operating system 100 and process operation method save the user the cost of installing recording tools and learning. The process control platform issues tasks to the process operating platform, and the process operating platform transfers the tasks to the task queue. The tasks are executed after being received by the idle endpoint task robot. Therefore, any entity or virtual host can be used as an endpoint task robot to perform tasks. There is no need to maintain the account password of the endpoint task robot on the process operating platform, and the control and responsibility of the endpoint task robot is delegated to the user side. Thus, the management effort of maintenance personnel is saved. After the endpoint task robot is executed, it notifies the maintenance personnel and the user end regardless of whether the execution succeeds or fails, so as to shorten the gap between the maintenance personnel and the user end, and immediately make the best follow-up measures.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which:

FIG. 2 is a flowchart of a process operation method in accordance with one embodiment of the present disclosure.

FIG. 4 is a schematic diagram of a management platform in accordance with one embodiment of the present disclosure.

FIG. 6 is a schematic diagram of a history record interface in accordance with one embodiment of the present disclosure.

FIG. 9 is a schematic diagram of a process compilation result in accordance with one embodiment of the present disclosure.

FIG. 10 is a schematic diagram of a message reply interface RPLY in accordance with one embodiment of the present disclosure.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
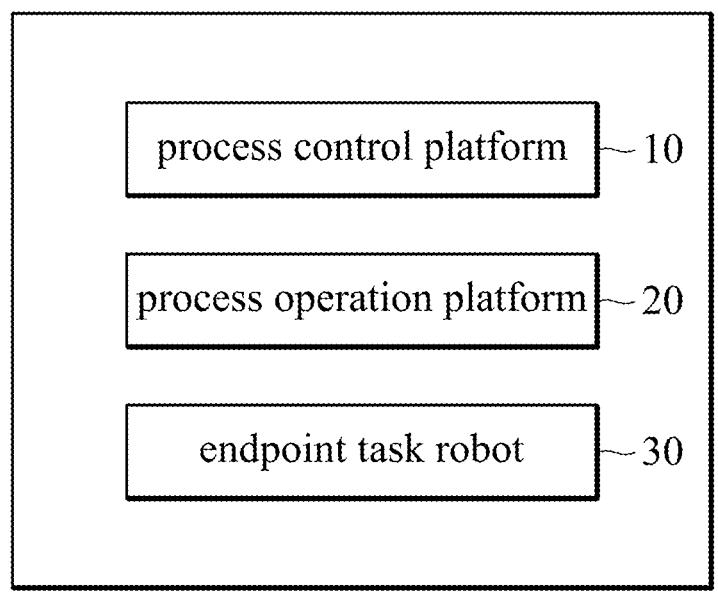
FIG. 1 is a schematic diagram of a process operating system in accordance with one embodiment of the present disclosure.

Please refer to FIG. 1. FIG. 1 is a schematic diagram of a process operating system 100 in accordance with one embodiment of the present disclosure. In one embodiment, as shown in FIG. 1, the process operating system 100 includes a process control platform 10, a process operating platform 20 and an endpoint task robot 30. In one embodiment, the process control platform can be implemented by a server, a laptop, or a desktop computer. In one embodiment, the process operating platform 20 can be implemented by a laptop, a desktop computer, or a virtual machine. In one embodiment, the endpoint task robot 30 can be implemented by a laptop, a desktop computer, or a virtual machine.

In one embodiment, the process operating platform 20 has the function of robotic process automation (RPA).

In one embodiment, a physical (for example, a server) or a virtual machine (for example, a virtual machine installed on a server) can be used as the endpoint task robot 30. Generally speaking, an entity or a virtual machine serves as an endpoint task robot 30.

In one embodiment, the process control platform 10, the process operating platform 20, and the endpoint task robot 30 each includes a processor, microcontroller, a digital signal processor, an application specific integrated circuit (ASIC) or a logic circuit.

In one embodiment, the process control platform 10 includes a storage device. The storage device can be implemented by a read-only memory, a flash memory, a floppy disk, a hard disk, a compact disk, a flash drive, a magnetic tape, a network accessible database, or a storage medium having the same function by those skilled in the art.

Figure 3:
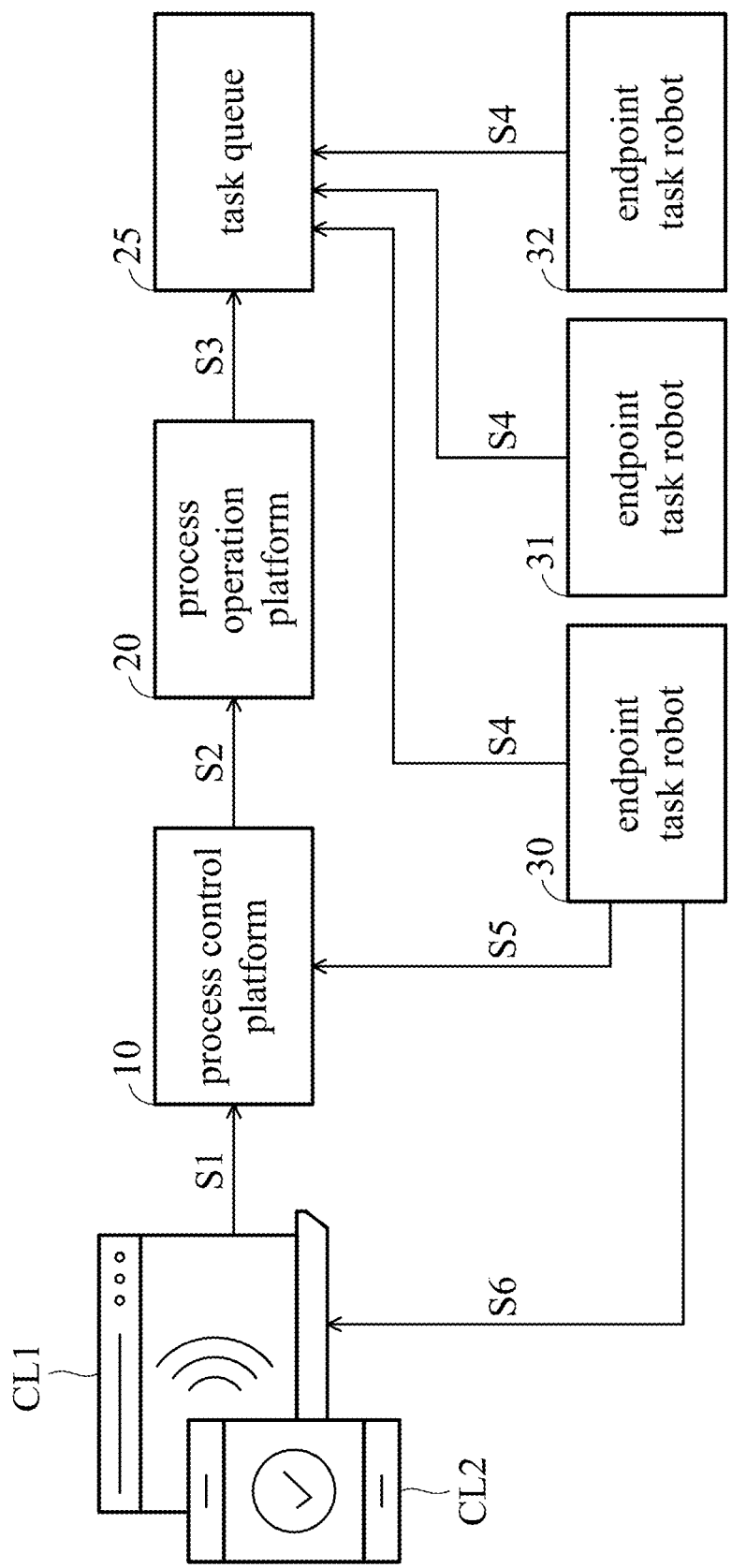
FIG. 3 is a schematic diagram of an example of a process operation method in accordance with one embodiment of the present disclosure.

Please refer to FIGS. 1 to 4 together. FIG. 2 is a flowchart of a process operation method 200 in accordance with one embodiment of the present disclosure. The process operation method 200 can be implemented by the process operating system 100 in FIG. 1. FIG. 3 is a schematic diagram of an example of a process operation method 200 in accordance with one embodiment of the present disclosure. FIG. 4 is a schematic diagram of a management platform 400 in accordance with one embodiment of the present disclosure.

In step 210, the process control platform 10 is used to receive operation information, retrieve a task from the operation information using a semantic analysis method, and publish the task.

In one embodiment, as shown in FIG. 3, the process control platform 10 is responsible for providing a user interface so that the user can start a series of task initiation operations. The user interface, for example, opens a web page CL1, an application CL2, or scheduled tasks to reach the start action of a task (such as email) through a user device (such as a mobile phone, laptop, or desktop). After receiving the demand, the user interface is mainly used as an interface for information transmission with the process operating platform 20 (step S1).

In one embodiment, the process control platform 10 receives an email and obtains a file from the email, and the process control platform 10 obtains the task from the file. In one embodiment, this file is, for example, an excel file. An example of the use of this excel file is when purchasing personnel make purchases, they record various material numbers, quantities, and models that need to be recorded in this excel file, and then attach this excel file to an e-mail, and send it to the process control platform 10. After receiving this email, the process control platform 10 automatically detects the attached file, such as identifying the text of the content of the letter (including the attached file field), or identifying the attached file by recognizing the icon in each field of the email, and then download or open the file, so as to retrieve a task (for example, a purchase task) in the operation information through a known semantic analysis method, and publish the task. The known semantic analysis methods are, for example, natural language processing (NLP), machine learning, text mining, parsing, etc.

In one embodiment, the process control platform 10 receives a file sent from an application program, and obtains tasks from the file. In one embodiment, the application program can be, for example, a chat robot, a virtual voice assistant, and the user inputs files through the application program. For example, if the user inputs "order processor, 10000 units, model i7", the process control platform 10 can receive this information sent from this application program. For another example, a user can directly input an excel sheet, a text file, or a form in a specific format into the application program, and the process control platform 10 receives these files sent from the application program.

In one embodiment, the user or maintenance personnel communicates with the process control platform 10 through the interactive text dialog application CL2, the web page CL1 (for example, the user enters text in the web page), and/or email. Through known semantic analysis technology, the process control platform 10 finally understands the needs of users or maintenance personnel for tasks, and presents a list of tasks to be executed, robot-related states, and current execution records on the management platform 400.

In one embodiment, as shown in FIG. 4, the management platform 400 can be presented by a web page, and the management platform 400 displays information about each host N1-N4. Each host N1-N4 can be named in advance, for example, the host N2 was named "DaVinci". The information includes the status of each host ST1-ST4, the robot-related status, and the execution record IFO1-IFO4 on the day.

In one embodiment, the management platform 400 further includes a further viewing interface for each host. For example, if the host information buttons BT1 to BT4 are pressed, a corresponding host information page is displayed. For example, if the host information button BT2 of the host N2 is pressed, the host information page 450 corresponding to the host N2 is displayed.

Figure 5:
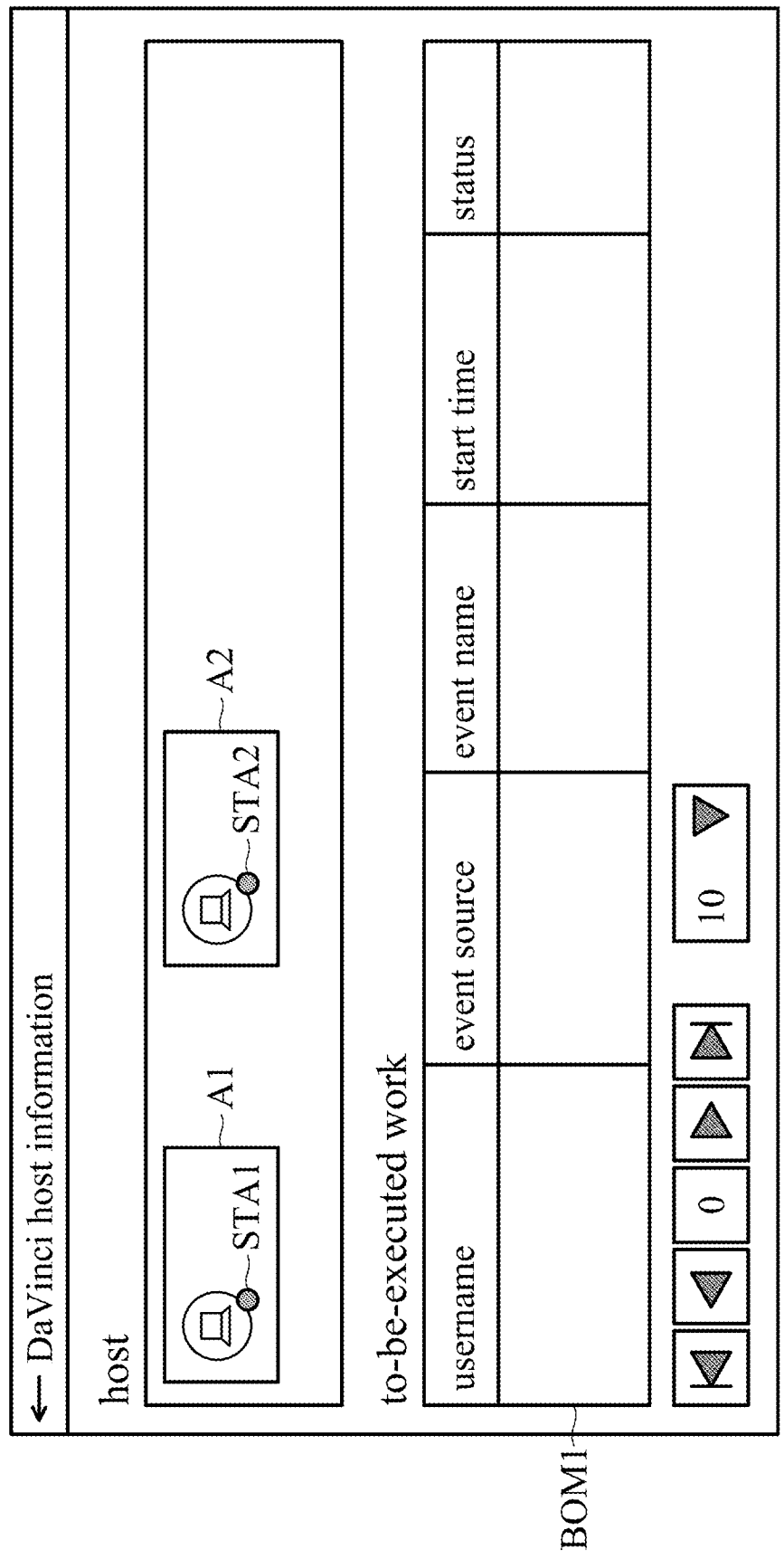
FIG. 5 is a schematic diagram of a host information page in accordance with one embodiment of the present disclosure.

FIG. 5 is a schematic diagram of a host information page 450 in accordance with one embodiment of the present disclosure. In one embodiment, when the host information button BT2 of the host N2 is pressed, the host information page 450 corresponding to the host N2 is displayed. The host information page 450 may be a pop-up window or a web page. In one embodiment, the host information page 450 displays the host name, for example, displays "Da Vinci host information" in the upper left corner of the window or webpage, and displays that the host N2 obtains two endpoint task robot information A1 and endpoint task robot information A2 provided by the process operating platform 20. There is a robot status prompt STA1 next to the endpoint task robot information A1. There is a robot status prompt STA2 next to the endpoint task robot information A2. When the robot status prompts STA1 to be green, it means that the endpoint task robot information A1 is idle. When the robot status prompts STA2 to be green, it means that the endpoint task robot information A2 is idle. When the robot status prompt STA1 is red, it means that the endpoint task robot information A1 is in the execution status. When the robot status prompt STA2 is red, it means that the endpoint task robot information A2 is in the execution state. In the example in FIG. 5, the endpoint task robot information A1 and the endpoint task robot information A2 are all in the idle state. Therefore, the robot status prompts STA1 and STA2 are all green.

However, the present invention is not limited to using red and green to represent robot status prompts, and other different colors, texts or symbols can be applied as robot status prompts.

In one embodiment, the two endpoint task robot information A1 and endpoint task robot information A2 provided by the process operating platform 20 further includes the endpoint task robot information A1 and the endpoint task robot information A2 respectively corresponding to the name of the endpoint task robot, the task being executed, and/or the execution time.

In one embodiment, the host information page 450 may display a to-be-executed worksheet BOM1, which includes the information of username, event source, event name, start time, status, etc. . . .

In the example shown in FIG. 5, since the endpoint task robot information A1 and the endpoint task robot information A2 are in an idle state, the content in the to-be-executed worksheet BOM1 is empty. Conversely, if the endpoint task robot information A1 and the endpoint task robot information A2 are in idle state, but there are tasks to be executed in the to-be-executed worksheet BOM1, it represents the endpoint task robot information A1 and/or the endpoint task robot information A2 corresponding to the endpoint task robot is damaged, or the task queue 25 has an error.

In one embodiment, the management platform 400 further includes a further viewing interface for each host. When one of the robot-related status and the positions of the current execution records IFO1 to IFO4 is pressed, the corresponding history record interface is entered. For example, if the robot-related status of the host N2 and the execution record IFO2 of the day is pressed, the history record interface 460 corresponding to the host N2 is displayed.

FIG. 6 is a schematic diagram of a history record interface 460 in accordance with one embodiment of the present disclosure. In one embodiment, when the robot-related status of the host N2 and the execution record IFO2 of the day is pressed, the history record interface 460 corresponding to the host N2 is displayed. The history record interface 460 may be displayed in a pop-up window or a web page. In one embodiment, the history record interface 460 can query history records by selecting event source, status, inputting event name, and/or inputting username. For example, when the event start date is set to Nov. 25, 2020, the event end date is set to Nov. 25, 2020, the event source is set to all, the status is set to completed, and the input event name and input username are not specified, the history record table BOM2 shows the username, event source, event name, start time, execution time, status and/or action of the task performed under these conditions. The username can be the name of the user or the name "Da Vinci" of the host N2. The event source can be a user sending a file via email, allowing the process control platform 10 to obtain a task from the file, or a scheduled task set by the host N2 in advance at a specific time period (tasks such as searching for news, regularly visiting a specific website to obtain forms . . . and so on). The action field can be a file that records the entire process of executing the task, and is provided to the maintenance personnel of the process control platform 10 for reference when needed.

In step 220, the process operating platform 20 is used to receive tasks and store the tasks in a task queue 25; after receiving the tasks, the process operating platform 20 defines a processing flow according to the tasks, and sorts the tasks in the task queue 25 in order.

Please refer to FIG. 3, after the process control platform 10 obtains the task from the file, the process control platform 10 transmits the task to the process operating platform 20 (step S2). In one embodiment, the process control management platform 10 transmits the endpoint task robots 30 to 32 that need to perform tasks together with task-related information (such as history records, host information) to the process operating platform 20, and the process operating platform 20 confirms that it is correct After that, the task is sent to the task queue 25 and continues to wait for the next task notification (step S3). In one embodiment, the process control management platform 10 transmits the related information of the endpoint task robots 30 to 32 that need to perform tasks and the related information of the task (such as history records, host information) to the process operating platform 20. After the process operating platform 20 confirms that it is correct, and the process operating platform 20 sends the task to the task queue 25 and continues to wait for the next task notification (step S3). When the process operating platform 20 receives multiple tasks, the process operating platform 20 calculates the priority execution value, and according to the priority execution value, the execution priority of each task is sorted and then stored in the task queue 25. The end-point task robots 30-32 of the process operating platform 20 find the current task to be executed in the task queue 25 according to this priority order, and actively obtain the relevant information of the current task from the process operating platform 20 (step S4).

In one embodiment, the endpoint task robots 30 to 32 can be endpoint task robots belonging to different units in the company. The endpoint task robots 30 to 32 can see all tasks of the process operating platform 20 and can also obtain all tasks. However, the endpoint task robots 30-32 only perform tasks that belong to their own category. For example, the endpoint task robot 31 belongs to the endpoint task robot of the purchasing unit, only performs tasks related to procurement, and will not perform tasks related to collecting news even if it receives the collecting news tasks. In one embodiment, when the endpoint task robot 31 is damaged, the endpoint task robot 32 automatically takes over temporarily processing tasks related to purchases.

In one embodiment, the process operating platform 20 defines a processing flow according to tasks. That is, the process operating platform 20 defines a standard operating procedure (SOP) according to the task. For example, for tasks related to procurement, the process operating platform 20 automatically (or pre-sets) the process of executing the task through the existing components and their parameters in a library. More specifically, the process operating platform 20 arranges the endpoint task robot 30 for procurement-related tasks to perform the following steps: first open the Chrome browser, click the login button, move to the main menu, click the price query, and click export excel, upload files, return execution results . . . etc. The library can be stored in the process operating platform 20 in advance.

However, this is only used as an example, and the detailed process will not be repeated. In addition, the process operating platform 20 can define different processing flow according to different tasks (such as searching for news, regularly going to a specific website to obtain forms, etc.).

In one embodiment, the process operating platform 20 adopts a high response ratio first (HRRN) scheduling algorithm, combined with the importance parameter, to calculate the priority execution value. The higher the priority execution value is, the faster it will be executed by the endpoint task robot, thereby defining the order in which the tasks are executed according to the characteristics of the tasks.

The mathematical formula of the high response ratio scheduling algorithm is: priority=(waiting time+required service time)/required service time. Its meaning is that under the same "waiting time" tasks, the shorter the "required service time", the easier it is to be executed first, to speed up the number of completed tasks. Under the same "required service time" task, the longer the "waiting time", the easier it is to be executed first, avoiding long waiting for the task. This method perfectly weighs the task of service time but does not consider the importance of the task. Therefore, the weight adjustment of the importance parameter α is added, so that the more important tasks can be executed faster.

Therefore, the priority execution value is the priority multiplied by the corresponding importance parameter α. The importance parameter α is calculated by 2/(L+1), and the symbol L is the user-defined importance 1 to 4, 1 represents the most important, 2 represents the second, and so on. The higher the number, the less important it is. The importance can be defined by the user in advance, the lack of material records in the historical record, or the frequency of performing the same task in a period.

In one embodiment, the lack of material record file that is most frequently clicked by maintenance personnel indicates that the importance of this task is higher, and its importance L is set to 1. The lack of material record file that is checked by the maintenance personnel secondly indicates that the importance of this task is more common, and the importance L is set to 2. The lack of material record files that are rarely viewed by maintenance personnel indicate that the importance of this task is low, and its importance L is set to 3. The historical record file that has not been clicked on means that the importance of this task is exceptionally low, and its importance L is set to 4.

In one embodiment, for example, the person with the highest frequency of performing the same task in a day indicates that the importance of this task is higher, and the importance L is set to 1. The second highest frequency of performing the same task in a day, the importance L is set to 2, and so on.

The following Table 1 is used as an example. When there are 5 tasks to be executed, the priority execution value and result are calculated by the above formula, and the order of the tasks in the task queue 25 is sorted according to the results.

TABLE 1

| task | 1 | 2 | 3 | 4 | 5 |
|---|---|---|---|---|---|
| waiting time (minutes) | 10 | 15 | 15 | 20 | 20 |
| required service time | 20 | 15 | 10 | 10 | 20 |
| priority | 1.5 | 2 | 2.5 | 3 | 2 |
| order of importance | 1 | 2 | 4 | 3 | 2 |
| α | 1 | 0.67 | 0.4 | 0.5 | 0.6 |
| result | 1.5 | 1.34 | 1 | 1.5 | 1.2 |

Table 1

It can be seen from Table 1 that priority=(waiting time+required service time)/required service time, so it will not repeat it here. After multiplying the priority of each task by the corresponding importance parameter α, the result is obtained. For example, the priority of task 1 is 1.5, multiplied by the corresponding importance parameter α is 1, and the result is 1.5. The priority of task 2 is 2, multiplied by the corresponding importance parameter α is 0.67, and the result is 1.34. The priority of task 3 is 2.5, multiplied by the corresponding importance parameter α is 0.4, and the result is 1. The priority of task 4 is 3, multiplied by the corresponding importance parameter α is 0.5, and the result is 1.5. The priority of task 5 is 2, multiplied by the corresponding importance parameter α is 0.6, and the result is 1.2. The result here refers to the priority execution value.

According to the example in Table 1, the process operating platform 2 will pass the tasks to the task queue 25 in order of task 1, task 4, task 2, task 5, and task 3 according to these 5 results to ensure that the more important and the shorter the task is, the faster it will be executed by the endpoint task robot (for example, endpoint task robots 30-32).

The results of task 1 and task 4 are both 1.5, but because of the first-in first-out concept, task 1 is received by the process operating platform 20 first, so the priority is ranked before task 4.

In one embodiment, the process operating platform 20 receives the status and execution information returned from the endpoint task robots 30-32 and transfers the status and execution information to the database for the process control platform 10 to query and use.

In one embodiment, when the maintenance personnel release a new version of the robot, the process control platform 10 will automatically update the new version to the process operating platform 20, and the process operating platform 20 sends the version information to a version queue for the endpoint task robots 30-32 to monitor.

In step 230, the endpoint task robot (taking the endpoint task robot 30 as an example) actively obtains tasks from the process operating platform 20, executes the tasks according to the processing flow, writes the execution result into the log queue, and transmits the execution result to the process control platform 10.

In one embodiment, after the endpoint task robot 30 confirms the connection with the process operating platform 20 and the task queue 25, the user can log in to the endpoint task robot 30 with the account and password of the endpoint task robot 30 to run. By installing an additional agent device, the endpoint task robot 30 can start accepting tasks. This method increases the flexibility of the enterprise to perform tasks.

In this way, the user logs in the endpoint task robot 30 with the account and password of the endpoint task robot 30, and the maintenance personnel does not need to ask the user for the account and password.

The task that the endpoint task robot 30 automatically obtains from the process operating platform 20 includes obtaining the following information: the person who activates the task, the device that activates the task, the robot that needs to perform the task, the globally unique identifier (GUID) of the email data, and the parameters, etc. Through these data, the endpoint task robot 30 can know which task to perform, where to get the data and report the task.

In one embodiment, the endpoint task robots 30 to 32 automatically obtain the corresponding tasks from the process operating platform 20 according to the order of the sorted tasks in the task queue 25.

Figure 7:
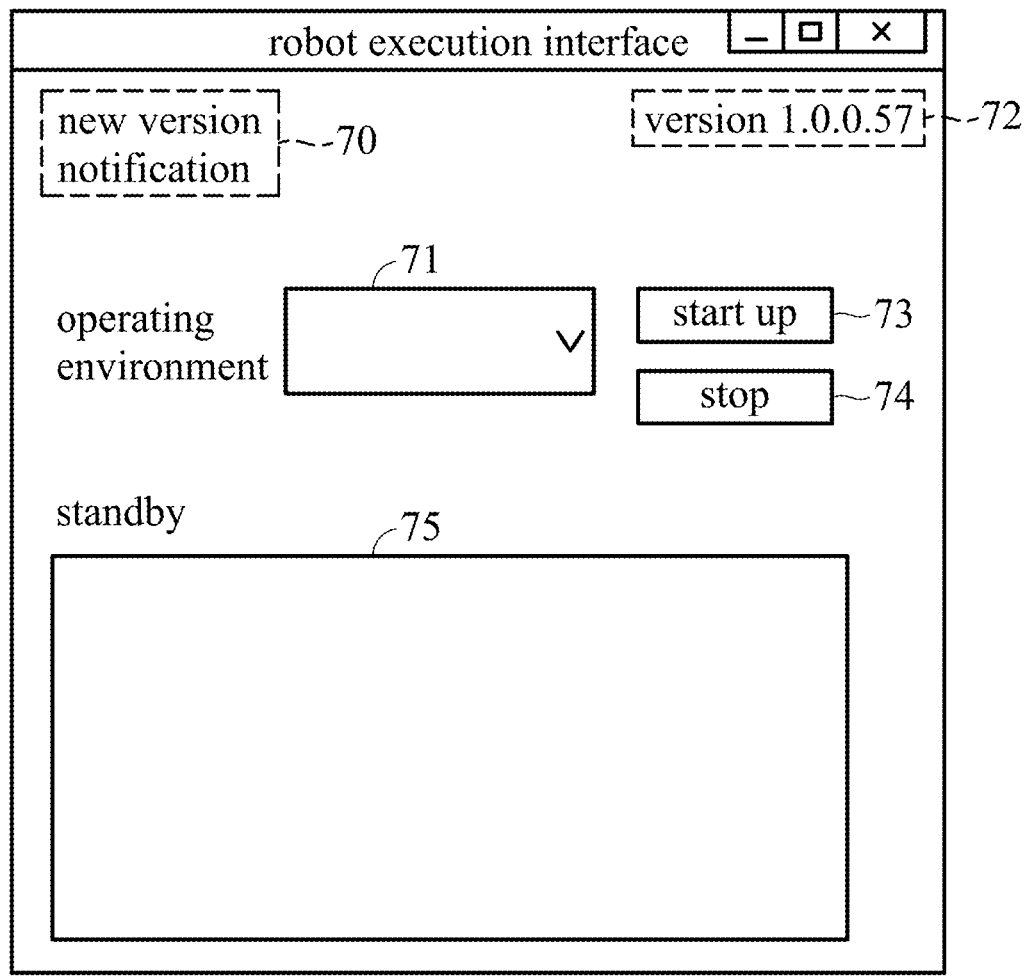
FIG. 7 is a schematic diagram of an example of a robot execution interface in accordance with one embodiment of the present disclosure.
Figure 8:
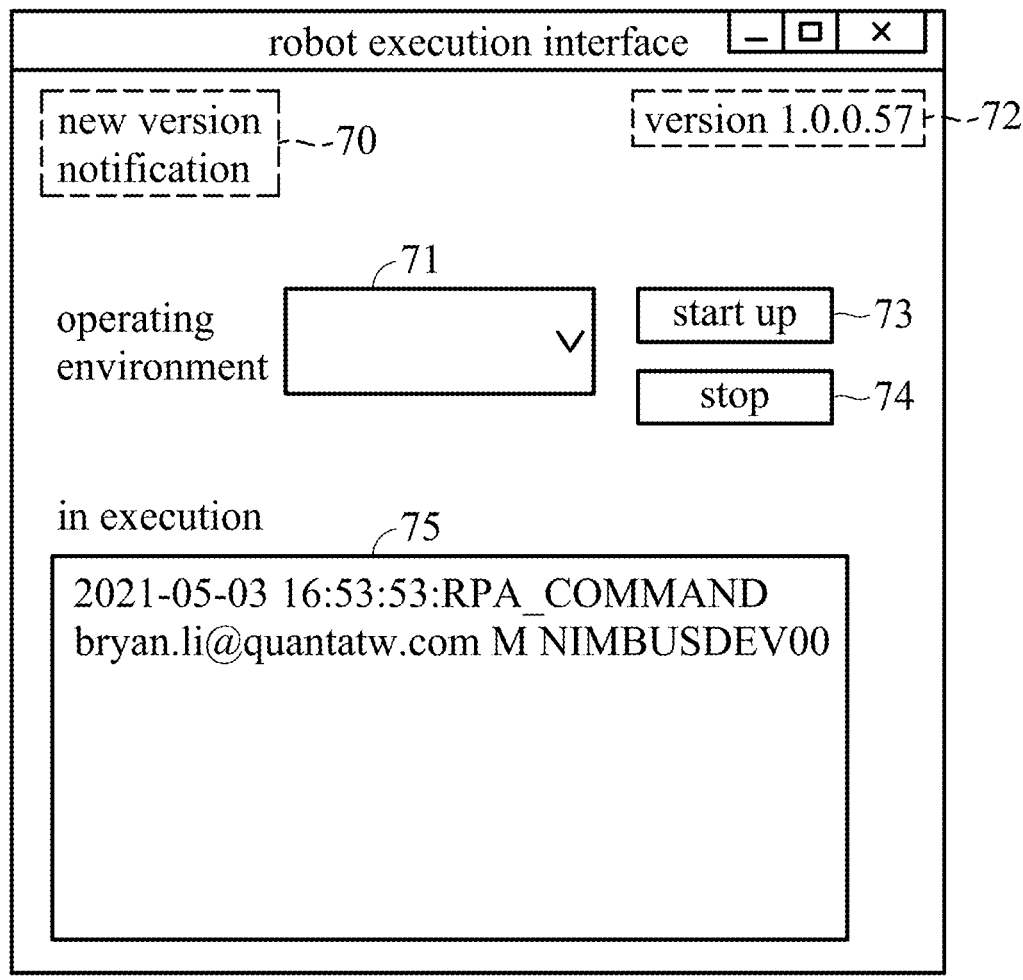
FIG. 8 is a schematic diagram of a robot execution interface in accordance with one embodiment of the present disclosure.

Please refer to FIGS. 7-8. FIG. 7 is a schematic diagram of an example of a robot execution interface 700 in accordance with one embodiment of the present disclosure. FIG. 8 is a schematic diagram of a robot execution interface 750 in accordance with one embodiment of the present disclosure.

In one embodiment, when the current state of the endpoint task robot 30 is idle and the process operating platform 20 issues an updated version, the endpoint task robot 30 is updated according to the updated version.

In one embodiment, the endpoint task robot (for example, the endpoint task robot 30) clearly displays the current version number 72 (version 1.0.0.57 shown in FIG. 7) in the robot execution interface 700. When the endpoint task robot 30 receives the new version information of the process operating platform 20 from the version queue, the new version notification 70 will display a hyperlink (or the new version notification 70 can be designed as a button, and the button status is changed from gray which cannot be clicked to black font which can be clicked). The endpoint task robot 30 confirms the current version number 72, and confirms that there is no task currently executing (the status is standby). At this time, the endpoint task robot 30 suspends receiving tasks, automatically download a new version of the robot software, and updates the version of the endpoint task robot 30. Finally, after the update is completed, the endpoint task robot 30 is automatically activated according to the previous setting. Therefore, the maintenance personnel do not need to monitor or operate on the side during the upgrade process, which shortens the upgrade steps and reduces the workload of the maintenance personnel. It is a great help for the automation of the acceptance and use process operating platform 20.

In one embodiment, the robot execution interface 700 includes displaying a robot name, a start button 73, a stop button 74, and/or a task field 75.

In one embodiment, the robot execution interface 700 includes displaying a robot name, a start button 73, a stop button 74, and/or a task field 75. In one embodiment, when there is a task, the maintenance personnel can manually press the start button 73 to make the endpoint task robot 30 start to perform the task. In one embodiment, when there is a task error, the maintenance personnel can manually press the stop button 74 to stop the endpoint task robot 30 from performing the task.

In FIG. 7, there is no task in the task field 75, so the endpoint task robot 30 is in a standby state.

In one embodiment, the idle endpoint task robot 30 monitors the corresponding task queue 25 according to the operating environment 71 (development, simulation or formal environment). This setting is convenient for maintenance personnel to test before the task goes online. The endpoint task robots 30-32 monitor and obtain information including task code, necessary parameters, and the robot responsible for execution (for example, the endpoint task robot 30).

In one embodiment, when the endpoint task robot 30 hears that it is not responsible for the task, the endpoint task robot 30 ignores the task and does not process the task, and the task remains in the queue. When the endpoint task robot 30 receives the task that it is responsible for, the endpoint task robot 30 takes the task and starts to execute the task, avoiding the task being repeatedly executed. At this time, the endpoint task robot 30 suspends the monitoring task queue to prevent a single robot from executing multiple tasks at the same time, which affects the result.

In one embodiment, the tasks are divided into user-defined webpage operation procedures and custom-developed software executable files. After the endpoint task robot 31 and the endpoint task robot 32 confirm the task type, the endpoint task robot 31 simulates the human operation on the web page according to the task flow. For example, open a webpage, click a button, enter a value, etc., and finally complete a predetermined task. The endpoint task robot 32 is passed into the execution file along with the parameters, and the execution file completes the operation and returns the execution result. The endpoint task robot 32 passes the parameters into the execution file, and the execution file completes the operation and returns the execution result. The similarity between the two is that after the task execution is completed, the endpoint task robots 31 and 32 turn to a waiting state and monitor a state queue, and report the execution result (execution success, execution failure, or execution timeout) at the end of the execution to the process control platform 10 (step S5).

In one embodiment, the endpoint task robots 31 and 32 selectively report the execution result to the user device (step S6), or the process control platform 10 reports the execution result to the user device.

In one embodiment, when the task is successfully executed, the process control platform 10 transmits the execution result to the process operating platform 20 and then send the execution result to the status queue. The endpoint task robot in the waiting state (for example, the endpoint task robot 31) stops waiting after receiving the end of its own task, changes the state to the idle state, and performs a new round of task monitoring.

In one embodiment, if the task execution fails, the process control platform 10 notifies the task owner (user). After confirming the problem, the endpoint task machine (for example, the endpoint task machine 31) is notified.

In one embodiment, the process operating system 100 further includes a log module, which can be built on a server in the manner of a virtual machine, or can be implemented by a server. The log module contains a log queue. In order to ensure that there is a complete record of each task execution process, there will be no omissions, in addition to a complete log on the local end of the endpoint task robot 30~32, a message queue technology is used. The endpoint task robot sends each task execution record to the log queue, and the process operating platform 20 has another task status agent to monitor the messages in the log queue, and writes the messages correctly into the database (this database can be stored in a server's storage device) after receiving them. Compared with each endpoint task robot 30-32 writing to the database, the advantage of this method is that the task status agent completes the reading and writing of the database, which is less likely to cause a deadlock to the database, and it will also speed up the processing on the database side.

In one embodiment, the process operating system 100 further includes a notification module, which can be built on a server in the form of a virtual machine, or can be implemented by a server. Regardless of whether the execution of the endpoint task robots 30-32 is completed, failed or timed out, the endpoint task robots 30-32 will not only report the execution result to the process operating platform 20, but also report the execution result to the notification module. The notification module sends notifications (such as sending emails) to the electronic devices of the task owner (such as the user) and the electronic devices of related management personnel (such as the user's department heads and/or colleagues). After the notification module sends a notification, the maintenance personnel can view the log queue and find the execution process file corresponding to the task in the database, to understand the cause of the error at the moment and deal with it appropriately, which greatly reduces the abnormal delay.

In one embodiment, the various queues mentioned in the present invention (such as task queue, log queue, status queue, version queue . . . etc.) can be stored in the storage device of the same server or in the storage space of the virtual machine.

Please refer to FIGS. 9-10. FIG. 9 is a schematic diagram of a process compilation result 900 in accordance with one embodiment of the present disclosure. FIG. 10 is a schematic diagram of a message reply interface RPLY in accordance with one embodiment of the present disclosure.

In one embodiment, the company can effectively shorten the development, testing and launch time through the process operating system 100. The specific process is that when the business unit wants to transfer the current process to the endpoint task robot for execution, the business unit contacts the developer of the management information center. After confirmation, the developer applies for robots and skills on the process control platform 10 (also known as the artificial intelligence platform), and starts editing the task process, captures human operations on the web, desktop or third-party systems, and corresponds to the components provided on the process operating platform 20 (also known as the RPA platform), to match the logic judgment of the demand. After the completion of the compilation process compilation result 900, the process compilation result 900 can be regarded as the task of actually querying the material price and uploading it to the company's internal system.

Then, the need to perform tasks is aroused through the process control platform 10, and the endpoint task robot (such as the endpoint task robot 31) selects a test environment for task testing. After receiving the task, the endpoint task robot performs the operation of the planning system in sequence, and the developer can directly view the task execution process on the screen. The endpoint task robot acts like a human operation after receiving the task. The endpoint task robot operates in sequence according to the process compilation. Developers can directly view the task execution process on the screen, and after the test is completed, developers can directly migrate the process compilation to the formal environment to go online.

Compared with the process in the past, which has a lot of manual operations, it takes from one to three months of manpower and time to develop, test, and complete the established process until launch time for the required process. The process operating system 100 using automated processes effectively shortens the development, testing, and launch time to about half a month, so the process operating system 100 is more than 50% faster.

During the test, the process operating system 100 performed more than 3,500 tasks in total. An endpoint task robot performs an average of 16.6 tasks (such as RPA tasks) in a single day. The types of tasks cover different units such as procurement, research and development, and business, compared with the past, human execution is freed by 1 to 5 hours of human time per week. In fact, take the task of querying material prices and uploading the company's internal system as an example, each column in the file are the operation steps of the endpoint task robot on the webpage, including the operations of clicking to open the webpage, inputting values, and clicking buttons. The process can include logical determinations of the success or failure of the execution, and there will be a complete log record for the success or failure of each step. When the task is completed, the endpoint task robot replies to the process control platform 20 and notify the owner of the task (for example, notify the owner of the task through the message reply interface RPLY as shown in FIG. 10) to complete a complete operation. The process is completely automated, without human intervention and determination.

The process operating system 100 and process operation method 200 described can use a library to store the components and their parameters required to perform the task. If there is a change in the new component or the old component, the library only needs to be updated. No need to adjust the overall system and logic. General user compiles the task flow on the setting web page according to the task requirements, the process operating system 100 and process operation method 200 save the user's the cost of installing recording tools and learning. The process control platform issues tasks to the process operating platform, and the process operating platform transfers the tasks to the task queue. The tasks are executed after being received by the idle endpoint task robot. Therefore, any entity or virtual host can be used as an endpoint task robot to perform tasks. There is no need to maintain the account password of the endpoint task robot on the process operating platform, and the control and responsibility of the endpoint task robot is delegated to the user side. Thus, the management effort of maintenance personnel is saved. After the endpoint task robot is executed, it notifies the maintenance personnel and the user end regardless of whether the execution succeeds or fails, so as to shorten the gap between the maintenance personnel and the user end, and immediately make the best follow-up measures.

In addition, the process operating system 100 and the process operation method 200 provide log records of the complete and step-by-step execution of tasks for the maintenance personnel to query and audit. In addition, after a new version of the endpoint task robot is released by the maintenance personnel, the back-end system automatically configures the upgrade file on the server and sends the version information to the version queue. The endpoint task robot monitors the version queue at any time. Once the version information is received, the endpoint task robot executes to display the version upgrade information by an interface, which is convenient for the endpoint task robot to upgrade the version automatically when it is idle or upgrade the version by the user. The method transfers the version update time by the maintenance personnel to the user for decision, or the endpoint task robot automatically updates the version when it is idle, which reduces the effort required by the maintenance personnel to control the version of the endpoint task robot.

The method of the present invention, or a specific type or part thereof, can exist in the form of code. The code can be included in physical media, such as floppy disks, CDs, hard disks, or any other machine-readable (such as computer-readable) storage media, or not limited to external forms of computer program products. When the program code is loaded and executed by a machine, such as a computer, the machine becomes a device for participating in the present invention. The code can also be transmitted through some transmission media, such as wire or cable, optical fiber, or any transmission type. When the code is received, loaded, and executed by a machine, such as a computer, the machine becomes used to participate in this Invented device. When implemented in a general-purpose processing unit, the program code combined with the processing unit provides a unique device that operates similar to the application of a specific logic circuit.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. A process operating system, comprising:
   a process control platform, comprising a first processor, wherein the first processor is configured to receive an operation information, extract a task from the operation information using a semantic analysis method, and publish the task;
   a process operating platform, comprising a second processor, wherein the second processor is configured to receive the task and store the task in a task queue; wherein, after receiving the task, the second processor defines a processing flow based on the task, and sorts an order of the task in the task queue; and
   an endpoint task robot, comprising a third processor, wherein the third processor is configured to automatically obtain the task from the process operating platform, execute the task according to the processing flow, write an execution result into a log queue, and transmit the execution result to the process control platform, wherein when current state of the endpoint task robot is idle and the second processor of the process operating platform issues an updated version, the endpoint task robot is updated according to the updated version.

2. The process operating system of claim 1, wherein the first processor of the process control platform receives an email, obtains a file from the email, and obtains the task from the file.

3. The process operating system of claim 1, wherein the first processor of the process control platform receives a file sent from an application, and obtains the task from the file.

4. The process operating system of claim 1, wherein the second processor of the process operating platform adopts a highest response ratio next (HRRN) scheduling algorithm and matches an importance parameter to calculate a priority execution value; wherein the higher the priority execution value, the faster the task will be executed by the third processor of the endpoint task robot at that point.

5. The process operating system of claim 1, wherein the first processor, the second processor, and the third processor are different.

6. The process operating system of claim 1, wherein the processing flow is a standard operating procedure (SOP) defined by a library.

7. A process operating method, comprising:
   receiving operation information, extracting a task from the operation information using a semantic analysis method, and publishing the task by a first processor of a process control platform;
   receiving the task and storing the task in a task queue using a second processor of a process operating platform; wherein, after receiving the task, the second processor defines a processing flow based on the task, and sorts an order of the task in the task queue; and
   using a third processor of an endpoint task robot to automatically obtain the task from the process operating platform, executing the task according to the processing, writing the execution result into a log queue, and transmitting the execution result to the process control platform,
   wherein when current state of the endpoint task robot is idle and the second processor of the process operating platform issues an updated version, the endpoint task robot is updated according to the updated version.

8. The process operating method of claim 7, further comprising:
   receiving an email, obtaining a file from the email, and obtaining the task from the file using the first processor of the process control platform.

9. The process operating method of claim 7, further comprising:
   receiving a file sent from an application, and obtaining the task from the file using the first processor of the process control platform.

10. The process operating method of claim 7, further comprising:
  using the second processor of the process operating platform to adopt a highest response ratio next (HRRN) scheduling algorithm and to match the importance parameter to calculate the priority execution value; wherein the higher the priority execution value, the faster the task will be executed by the third processor of the endpoint task robot at that point.

11. The process operating system of claim 9, wherein the first processor, the second processor, and the third processor are different.

12. The process operating system of claim 9, wherein the processing flow is a standard operating procedure (SOP) defined by a library.

* * * * *